Dec. 4, 1962

S. PATERNO 3,066,949

KICK OR SCUFF SHIELD FOR THE SEATING
COMPARTMENT OF AUTOMOTIVE VEHICLES
Filed Oct. 24, 1960

WITNESS
NORMAN G. TRAVISS

INVENTOR
SAMUEL PATERNO
BY Talbert Dick & Darley
ATTORNEYS

United States Patent Office 3,066,949
Patented Dec. 4, 1962

3,066,949
KICK OR SCUFF SHIELD FOR THE SEATING COMPARTMENT OF AUTOMOTIVE VEHICLES
Samuel Paterno, 1808 Payton St., Des Moines, Iowa
Filed Oct. 24, 1960, Ser. No. 64,419
1 Claim. (Cl. 280—150)

This invention relates to protective shields and more particularly to an attachable kick shield for the wall adjacent a door of the seating compartment of an automotive vehicle.

Perhaps of all the interior sections of the seating compartment of a vehicle to show the most wear and undesirable appearance is that lower wall area of the vehicle just forward of the door. The reason for this is that the feet of the driver or passenger are continuously engaging and striking this area which is just above the floor board. Also, in most instances this wall area is of fabric upholstering, which has a tendency to receive and retain dirt such as mud or like from the shoes of the people in the vehicle.

Therefore, one of the principal objects of my invention is to provide attachable-detachable kick shields for the lower wall areas of the seating compartment of a vehicle just forward of the vehicle doors.

More specifically the object of this invention is to provide a plastic or like kick shield that is capable of being hooked onto the bead cord of the upholstery in the seating compartment of an automotive vehicle for shielding the upholstery of the vehicle against wear and dirt from the shoes of the occupants of the vehicle.

A further object of this invention is to provide a kick shield for the seating compartment of vehicles that is highly resistant to wear and dirt and thereby easily maintained in clean condition.

A still further object of this invention is to provide a kick shield for the seating compartment of automotive vehicles that may contain information or data for the user of the vehicle.

Further objects of this invention are to provide a kick shield for the seating compartment of automotive vehicles that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

FIG. 6 is a perspective view showing my device installed on the driver's side of the seating compartment of an automobile or like.

As herebefore indicated, a shield may be installed forward of both the left and right doors of a vehicle. Inasmuch as both shields would be duplicates except for reversement, I will describe only one shield and particularly the shield that is used on the left side because that is the side that is most subject to wear.

Figure 6:
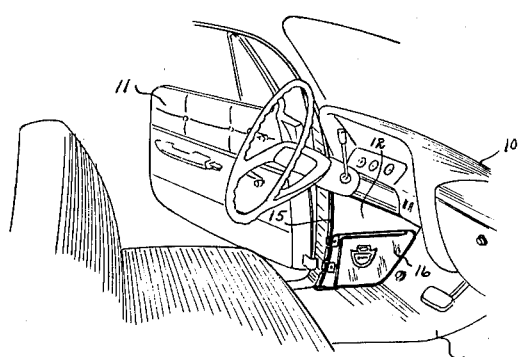

In the drawings I have have used the numeral 10 to generally designate an automotive vehicle having a seating compartment with a door 11 and an upholstered lower wall area 12 just forward of the door and above the floor board 13 as shown in FIG. 6. On substantially all present day vehicles there is an upholstery bead cord 15, circular in cross section and positioned adjacent the inside door opening. It is to such equipment that I attach my kick shield and which I will now describe in detail.

Figure 1:
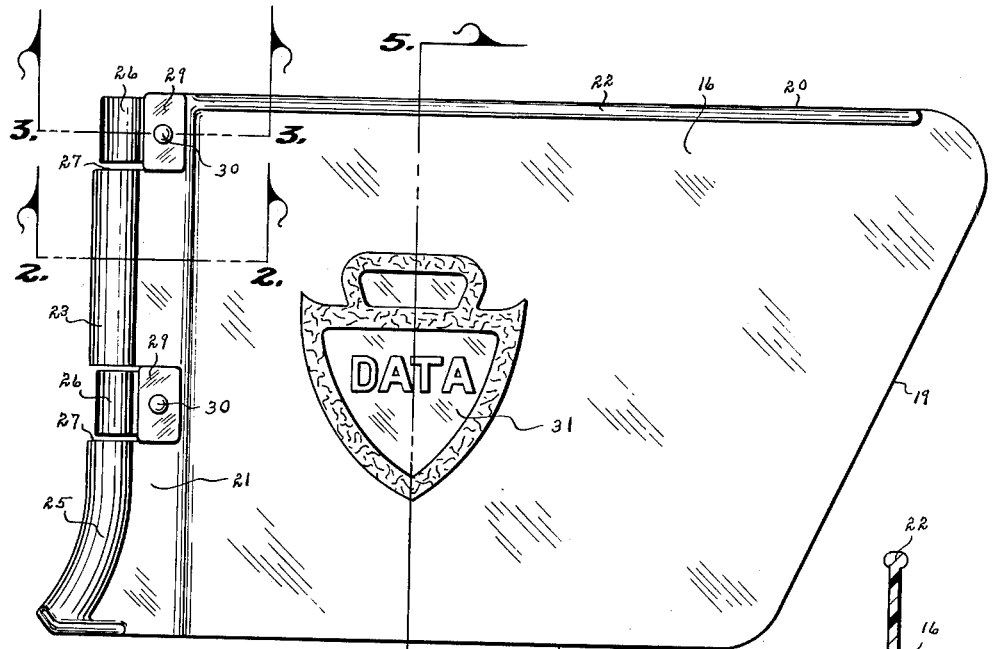
FIG. 1 is a face view of my kick shield ready for use.
Figure 2:
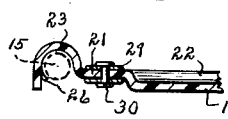
FIG. 2 is a cross-sectional view of the device taken on line 2—2 of FIG. 1 and more fully illustrates its construction.
Figure 3:
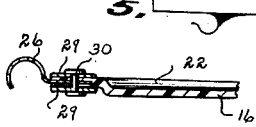
FIG. 3 is a cross-sectional view of the device taken on line 3—3 of FIG. 1 and shows one method of securing the spring hook clamps.
Figure 4:
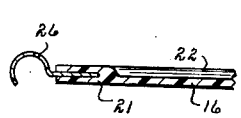
FIG. 4 is a cross-sectional view of one of the spring hook clamps embedded in the marginal edge portion of the plastic shield.

The numeral 16 designates a plate of hard plastic or like having a lower marginal edge 17, a forward marginal edge 19, a top marginal edge 20 and a rear marginal edge area 21 as shown in FIG. 1. The forward marginal edge 19 of the plate extends forwardly and upwardly to complement the forwardly and upwardly extending forward end portion of the floor board 13 as shown in FIG. 1. The numeral 22 designates a bead formed on the upper marginal edge 20. This bead 22 not only strengthens the plate but extends toward the upholstering, engages the same and thus prevents dirt and dust from falling downwardly between the installed kick shield and the wall 12 of the vehicle. The rear edge area 21 is offset in a direction away from the wall 12 as shown in FIG. 2 so that the main portion of the plate will tightly engage the upholstered wall 12 of the vehicle. The edges 17 and 19 of the plate are not obstructed so that they may extend in the crack between the floor board 13 and the side 12 or between the usual floor mat of the vehicle and the side 12. As before indicated, my kick shield is attachably-detachably connected to the bead cord 15 of the upholstery. Therefore, the extreme marginal edge area of the portion 21 is formed into hook portions 23 and 25 as shown in FIG. 1. When the device is installed, these hook portions 23 and 25, and which are an integral part of the plate 16, are hooked around the bead cord 15. However, in order that this hooking onto the bead cord 15 is most effective, I further employ the use of metal spring curved hook members 26. Cut away portions 27 in the portions 23 and 25 are provided for these metallic hook members 26. Any suitable means may be used for securing these spring metal clips 26 to the plate 16. In FIG. 4 I show the inner ends of the hook member embedded in the plastic at time of manufacture. If desired, a washer 29 may be placed at each side of the plate and a rivet 30 extended through them, the plate and the member 26 as shown in FIG. 3. These hook catch members 26 resiliently extend around and engage the bead cord 15 thereby successfully yieldingly securing the rear end of the plate 16 to the bead cord 15 as shown in FIG. 6.

Figure 5:
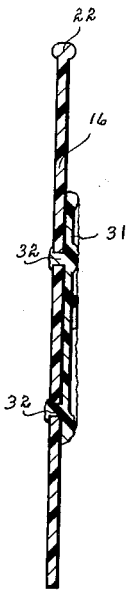
FIG. 5 is a longitudinal-sectional view of the device taken on line 5—5 of FIG. 1 and shows one method of attaching a data plate to the face of the kick shield.

The plate 16, when installed, will protect the wall 12 and also have a very pleasing appearance. Suitable information or data may be placed on the face of the plate 16. In the drawings I show a separate plate 31 for containing the desired data. These plates 31 may be secured by any suitable means such as glue, snapping into an opening in the plate 16 or as shown in FIG. 5, may have resilient prongs 32 extending into holes extending through plate 16.

Some changes may be made in the construction and arrangement of my kick or scuff shield for the seating compartment of automotive vehicles without departing from the real spirit and purpose of my invention, and it is my intention to cover by my claim, any modified forms of structure or use of mechanical equivalents which may be reasonably included within their scope.

I claim:

An article of manufacture adapted to serve as a protective shield for the inside wall of the driver's compartment of a vehicle between the door edge and the fire wall, the door edge including a bead cord of upholstery, the article comprising:
- a plate having a relatively flat main portion with a straight normally horizontally disposed upper edge, a slanted forward edge adapted to fit against the fire wall in a complementary relationship, a straight lower edge parallel to said upper edge, and a rear edge offset outwardly from said main portion relative to the inside wall;
- a bead formed on said upper edge, extended substantially the entire length thereof, and adapted to fit tightly against the inside wall to provide against the entry of foreign matter between said plate and the inside wall;
- at least a pair of vertically spaced hook portions formed integral with said rear edge and adapted to loosely engage the bead cord; and
- at least a pair of spring metal hook members at least one of which is disposed intermediate said hook portions, and both of which are adapted to tightly engage the bead cord.

References Cited in the file of this patent

UNITED STATES PATENTS

| | | |
|---|---|---|
| 2,048,105 | Cobbs | July 21, 1936 |
| 2,467,001 | Allen | Apr. 12, 1949 |
| 2,468,439 | Gregorious | Apr. 26, 1949 |
| 2,478,161 | Russell | Aug. 2, 1949 |
| 2,542,181 | Core | Feb. 20, 1951 |
| 2,714,015 | Sherman | July 26, 1955 |
| 2,922,515 | Barnes | Jan. 26, 1960 |
| 2,931,114 | Peterson | Apr. 5, 1960 |

FOREIGN PATENTS

| | | |
|---|---|---|
| 472,724 | Canada | Apr. 10, 1951 |